US010498887B2

(12) United States Patent
Quilici et al.

(10) Patent No.: US 10,498,887 B2
(45) Date of Patent: *Dec. 3, 2019

(54) SYSTEM AND METHOD FOR IDENTIFYING AND HANDLING UNWANTED CALLERS USING A CALL ANSWERING SYSTEM

(71) Applicant: YouMail, Inc., Irvine, CA (US)

(72) Inventors: Alexander E. Quilici, Malibu, CA (US); Michael J. Rudolph, San Juan Capistrano, CA (US)

(73) Assignee: YouMail, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,163

(22) Filed: Sep. 13, 2018

(65) Prior Publication Data
US 2019/0098132 A1 Mar. 28, 2019

Related U.S. Application Data

(63) Continuation of application No. 15/412,182, filed on Jan. 23, 2017, now Pat. No. 10,110,739, which is a
(Continued)

(51) Int. Cl.
H04M 1/56 (2006.01)
H04M 15/06 (2006.01)
(Continued)

(52) U.S. Cl.
CPC ....... *H04M 3/436* (2013.01); *H04M 3/42042* (2013.01); *H04M 3/42059* (2013.01);
(Continued)

(58) Field of Classification Search
USPC ............... 379/142.06, 88.08, 88.19
See application file for complete search history.

(56) References Cited

U.S. PATENT DOCUMENTS 9,591,131 B2* 3/2017 Quilici .................. H04M 3/436
2003/0169857 A1* 9/2003 Akhteruzzaman .... H04M 3/382
379/88.01

(Continued)

*Primary Examiner* — Quoc D Tran
(74) *Attorney, Agent, or Firm* — Meister Seelig & Fein LLP; Seth H. Ostrow, Esq.

(57) ABSTRACT

A method and system for identifying an unwanted caller using a call answering system. The method comprises receiving, by a call records server, information about callers from a plurality of telephony devices and one or more phone number data sources, classifying, by the call records server, one or more of the callers as either wanted or unwanted callers based on the received information, and storing, by the call records server, the received information and the classification of the one or more of the callers into a directory. The method further comprises identifying, by a call answering server, that a call from a given caller from a phone number to a receiving telephony device is from an unwanted caller by searching the directory, and handling, by the call answering server, the call from the given caller according to one or more preferences of the user, the one or more preferences including rejecting the call from the receiving telephony device, playing a recorded message, and disposing of the call.

40 Claims, 3 Drawing Sheets

Related U.S. Application Data continuation of application No. 15/133,442, filed on Apr. 20, 2016, now Pat. No. 9,591,131.

(60) Provisional application No. 62/150,244, filed on Apr. 20, 2015.

(51) Int. Cl.
  *H04M 3/436* (2006.01)
  *H04M 3/42* (2006.01)
  *H04M 3/533* (2006.01)

(52) U.S. Cl.
  CPC ... *H04M 3/42068* (2013.01); *H04M 3/42153* (2013.01); *H04M 3/53391* (2013.01); *H04M 2203/551* (2013.01); *H04M 2215/0164* (2013.01); *H04M 2250/60* (2013.01)

(56) References Cited

U.S. PATENT DOCUMENTS

2011/0280160 A1* 11/2011 Yang ................ H04L 65/1079
  370/259
2012/0128144 A1* 5/2012 Chislett .............. H04M 3/436
  379/201.01

* cited by examiner

SYSTEM AND METHOD FOR IDENTIFYING AND HANDLING UNWANTED CALLERS USING A CALL ANSWERING SYSTEM

CROSS REFERENCE TO RELATED APPLICATIONS

The present application is a continuation and claims the benefit of U.S. patent application Ser. No. 15/412,182 titled "SYSTEM AND METHOD FOR IDENTIFYING UNWANTED CALLERS AND REJECTING OR OTHERWISE DISPOSING OF CALLS FROM SAME" filed Jan. 23, 2017, which application claimed priority to U.S. Pat. No. 9,591,131 titled "SYSTEM AND METHOD FOR IDENTIFYING UNWANTED CALLERS AND REJECTING OR OTHERWISE DISPOSING OF CALLS FROM SAME" filed Apr. 20, 2016, which application claimed priority to U.S. Provisional Application No. 62/150,244, entitled "SYSTEM AND METHOD FOR IDENTIFYING UNWANTED CALLERS AND REJECTING OR OTHERWISE DISPOSING OF CALLS FROM SAME," filed on Apr. 20, 2015, the disclosures of which are hereby incorporated by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The invention described herein generally relates to Internet-enabled telephone devices, software and operating systems—both wireless and landline—capable of determining and blocking calls from unwanted callers.

Description of the Related Art

Telephone users may receive calls from callers such users generally and collectively agree are unwanted—typically because the caller is unsolicited, such as a telemarketer who is sequentially or randomly calling upon the audience and is not one of such users' typical known callers with which such users' have a pre-existing relationship. This is particularly true in mobile communication systems where mobile telephone users will often be interrupted at any time by unwanted calls. In addition, unsolicited messages may be left in voice mail systems of users who configure their landline and wireless telephone devices to forward their unanswered calls to such voice mail systems to answer their unanswered phone calls. Voice mail left by unwanted callers is an especially expensive problem for users who must retrieve messages from the voice mail system via cell phones, long distance calls, or transcriptions. Voice mail left by unwanted callers causes users to spend real dollars (air time, per minute charges, toll free charges to enterprise, voicemail transcription, etc.) and waste precious time on messages to which they do not want to listen.

Current solutions are inadequate in resolving problems with unwanted callers. Caller ID systems allow recipients to screen the source of incoming calls, but many callers can either "spoof" a fake number to avoid recognition or block their Caller ID information entirely so that no information is provided to a recipient about the caller. Call-blocking features allow recipients to block callers from specific phone numbers and those that intentionally block their calling information. Government telemarketing restriction lists allow recipients who take certain specific steps to be listed as people who do not wish to be called by telemarketers, but such lists are not fully effective to avoid unwanted telephone calls.

From the above description, it can be seen that current solutions are not suitable for preventing unwanted phone calls. Accordingly, technology is needed in order to enable effective call blocking.

SUMMARY OF THE INVENTION

The present application provides a method and system for identifying an unwanted caller using a call answering system. The method comprises receiving, by a call records server, information about callers from a plurality of telephony devices and one or more phone number data sources, classifying, by the call records server, one or more of the callers as either wanted or unwanted callers based on the received information, and storing, by the call records server, the received information and the classification of the one or more of the callers into a directory. The method further comprises identifying, by a call answering server, that a call from a given caller from a phone number to a receiving telephony device is from an unwanted caller by searching the directory, and handling, by the call answering server, the call from the given caller according to one or more preferences of the user, the one or more preferences including rejecting the call from the receiving telephony device, playing a recorded message, and disposing of the call.

The recorded message may be a disconnected tone. Receiving the information about callers may further comprise receiving call logs from the plurality of telephony devices. For instance, the call logs may be received from call answering applications executing on application-enabled phone devices. According to another embodiment, receiving the information about callers may further comprise collecting contact and address book information that is stored on the plurality of telephony devices. The contact and address book information may be collected from call answering applications executing on application-enabled phone devices. The contact and address book information may also be synchronized from the plurality of telephony devices into the directory through a computer network. In another embodiment, the method further comprises collecting call logs and contact and address book information from a plurality of application-enabled phone devices. Receiving the information about callers may further comprise collecting telephone listings and directories of caller information. Alternatively, receiving the information about callers may further comprise receiving billing records and call detail records from service providers. In yet another embodiment, receiving the information about callers may further comprise receiving voicemail data.

The method may further comprise receiving enhancements to the directory from users of the plurality of telephony devices or assigned administrators of the directory, wherein the enhancements to the directory include at least one from the group consisting of: edits of caller identification information, edits of images related to the callers, and edits to the classification of the one or more of the callers as wanted or unwanted callers. End-user provided information about a likelihood a given phone number is from an unwanted caller can be received by the call records server. Agreement or disagreement with the classification of the one or more of the callers as unwanted from users of the plurality of telephony devices may also be received.

In one embodiment, the method further comprises communicating, by the call answering server, with a call answering application executed on the receiving telephony device, the call answering application utilizing the classification of the given caller to determine how calls from calling parties should be handled based on stored preference information including allowing the calling parties to be greeted as a wanted caller and to record a message, or rejecting and disposing the calls from the calling parties as unwanted callers by playing a message or a tone indicating that the receiving telephony device is disconnected or no longer in service and terminating the calls.

An unidentifiable call may be received from an unknown or intentionally hidden calling number. Accordingly, a caller from the unknown or intentionally hidden calling number may be prompted to provide a valid calling number. Another embodiment includes indicating to a caller from the unknown or intentionally hidden calling number that the telephony device is not accepting calls from the unknown or intentionally hidden calling number. Alternatively, a caller from the unknown or intentionally hidden calling number may be indicated of the telephony device not accepting any calls. In yet another embodiment, the method further comprises playing a disconnected message and hanging up on the caller from the unknown or intentionally hidden calling number.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
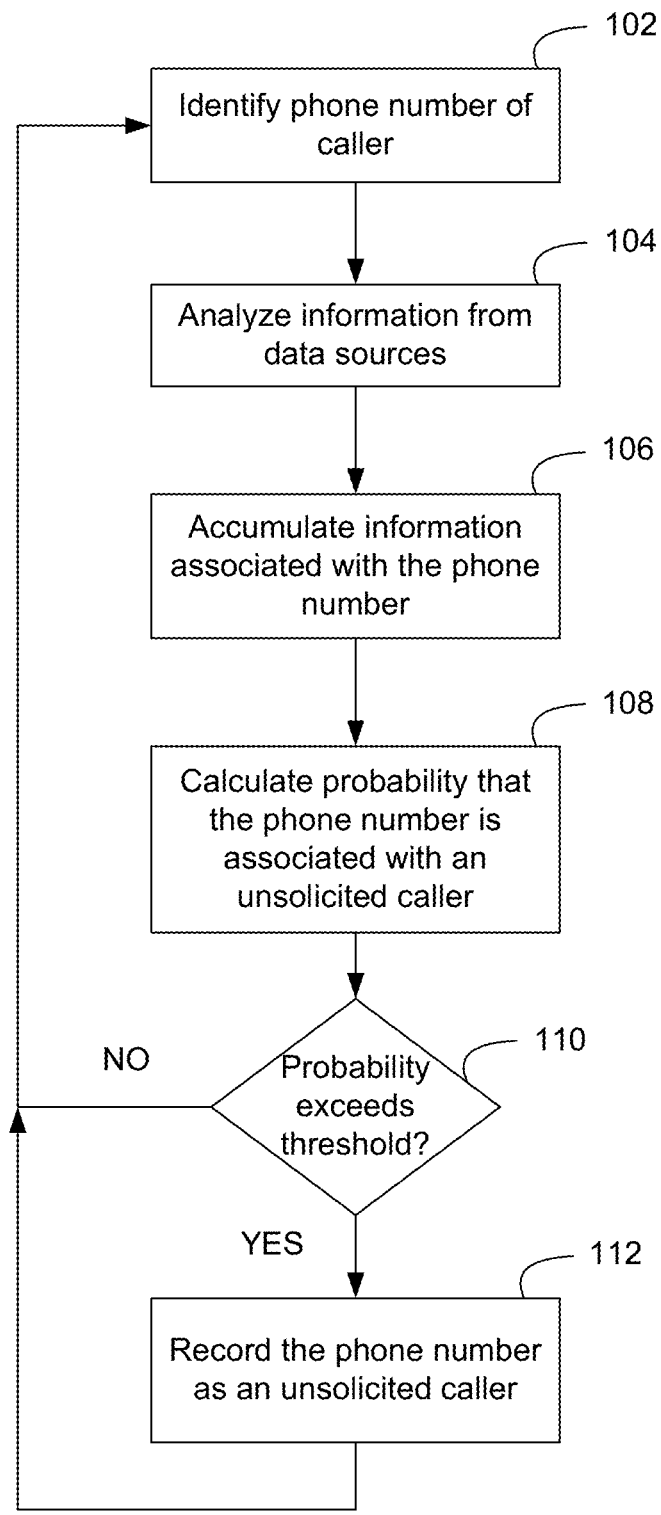
FIG. 1 illustrates a flowchart of a method for determining unwanted callers according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

The present application describes methods and systems for identifying an unwanted caller by employing a call answering system and taking one or more actions with respect to such unwanted calls based, in some embodiments, on user preferences. According to embodiments of the present invention, a call answering system is provided to serve as a voicemail system, or otherwise, replace or augment existing call answering systems or the voicemail service of users' telephony devices. Calls of which users don't answer (e.g., they ignore them, are busy, or their phone is off) can be forwarded to a call answering service server, where a variety of activities are performed, such as, determining who is calling, filtering out unwanted callers, greeting callers by name and with status information, recording messages left by callers, transcribing the recorded messages, and delivering the recorded messages. The call answering service server is capable of automatically figuring out which callers are generally unwanted callers and then blocking them. Each incoming number that calls a receiving phone device may be determined whether it is associated with an unwanted caller, and then if they are, SIT (special information tones) tones and a "the number you have dialed is out of service" message may be played to the unwanted caller to give the appearance that the number of the receiving phone device is out of service (which generally causes them to stop calling). A determination of unwanted callers may be achieved by leveraging a variety of data sources and aggregating information from the data sources.

The methods in some embodiments include a call records server collecting information about callers from a wide audience of telephony devices and one or more other data sources and storing the collected information in a caller directory. The collected information includes call logs collected from the wide audience of connected telephony devices over a computer or communication network, and contact and address book information stored on telephony devices or other directories containing caller information.

Callers can be identified as either wanted or unwanted callers based on the stored information in the caller directory, in accordance with one or more rules. The rules may identify unwanted callers as those who make too many calls within given period of time, those who leave identical voicemails, or those identified as likely unwanted callers from other sources. Additionally, callers may be categorized into or flagged as entities such as a bank, telemarketer, debt collector, etc. The directory of caller information may be enhanced by users of the telephony devices or assigned administrators of the directory, where the enhancements to the information include one or more of the following: editing of caller identification information, editing images that may be related to the caller, or editing the classification of the caller as a wanted or unwanted caller.

According to an embodiment of the present invention, the call answering system may include a call answering application executing or running in the background on a telephony device operable to communicate with a call answering service server. The telephony device may receive a call from a given caller. The given caller may be identified by the call answering application or the call answering service server as having been classified as a wanted or unwanted caller based on certain information from the caller directory such as its phone number or other calling activity. If the given caller is identified as an unwanted caller, the call answering service server (or the application, or a combination of both) can identify the given caller as an unwanted caller to a user of the telephony device, and automatically direct the caller to the call answering service server to reject the unwanted caller from the telephony device, or otherwise dispose of the received call.

According to another embodiment, the classification of the given caller can determine how a calling party should be handled by the call answering service server. The call answering service server may be instructed based on stored preference information associated with the user or telephony device to either, allow the calling party to be greeted as normal, as a wanted caller, (and optionally record a message), or reject and/or dispose of the calling party as an unwanted caller (and optionally playing a message or a tone implying the device or system is disconnected or no longer in service) and terminate the call. According to another embodiment, the call answering service server may challenge or prompt a given caller who has not provided or intentionally hidden or "spoofed" the calling number to provide a valid calling number such that classification of the given caller as wanted or unwanted can be determined and cannot be circumvented by omitting, disguising or "spoofing" the calling number.

FIG. 1 illustrates a flowchart of a method for determining unwanted callers according to an embodiment of the present invention. A call record server may collect information about callers who have been directed to the call answering service server. A phone number of a caller is identified, step 102. The phone number may be received or recorded by a call record server from call logs or contact information from application-enabled phone devices. The phone number may be any type of phone number (e.g., landline, cellular, VoIP, etc.) and identified via caller ID or other similar services. Information from data sources are analyzed, step 104. The call record server may gather information associated with the phone number of the caller from a wide, distributed audience of telephone users and phone number data sources (e.g., phone books, other call answering systems, voicemail systems, phone network systems (e.g., private branch exchange ("PBX")), telephone listings and directories, etc.) and collect it centrally at the call record server for evaluation to identify whether the phone number is associated with an unwanted caller.

Call patterns may be determined by the call record server based on several kinds of information about a caller from the telephone users and phone number data sources such as the ones listed in the following:

1) Any or all past calls that may have been received by the call answering system (phone number of caller, name if known, time of call, and who was called).

2) Any or all past calls that have called devices associated with the call answering system (e.g., call logs from native call log application, calling application, or the call answering application running on application-enabled phones, and/or contact lists on the application-enabled phones).

3) Voicemails that have been transcribed, which can be encoded to preserve privacy—voicemail systems (such as ones provided by cellular network providers) shared by millions of users of telephone devices, possess a database of call records and can be used to perform analytics on those calls to determine attributes about calling parties that are shared across the owners of those devices. For example, if a telemarketer at 1-800-555-8000 were to call consumers, the call answering service server can determine from the call records that a large number of the device owners all received a call in the same day from that telemarketer and the majority did not answer it. Additionally, the calling telemarketer either chose not to leave a recorded voicemail for the party that was called, or chose to leave the same recorded voicemail for all called parties. Combined with the ability to optionally synchronize other data from telephone devices, namely contacts stored within those devices, the system can also determine other attributes about the calling party—namely that the calling party was not a pre-existing contact of the majority of called parties.

4) Contacts of users or subscribers of phone devices and other data related to the contacts (which may include information about whether or not the user wants to have calls from that contact).

5) Various publically available or private databases (such as toll-free number directories, residential white page lists, yelp's list of businesses, etc.).

6) Various lookup tools to discover information about a number (such as which carrier it is connected to, whether or not it's wireless, what name might be associated with it). Unwanted callers typically employ techniques where they have selected a particular number to perform these unwanted calls in bulk—a number that has not historically been used for this purpose prior to a given date. By examining the full history of calls by the calling party over a time period, for example, the past year—it can further be determined that a caller is doing something unusual by suddenly going from not placing calls to a wide audience to suddenly doing so.

7) Tools that allow curated information about phone numbers to be provided.

8) End-user provided information (e.g., received from application-enabled phone or computing devices) about the likelihood a number is that of an unwanted caller.

9) Phone numbers of callers explicitly identified or indicated as unwanted by users.

Information associated with the phone number is accumulated, step 106. The information about the callers and the analysis of the information by the call record server may be transmitted to and stored on a phone directory server. Information stored in the phone directory server is useable by users of either, private or public parties, and may be shared to either other private or public parties. Additionally, users may be able to edit or categorize certain numbers in the phone directory server as entities, such as, a bank, telemarketer, debt collector, etc. Information in the phone directory server may also be enhanced by users of the telephony devices or assigned administrators of the directory. The enhancements to the information include one or more of the following: editing of caller identification information, editing images that may be related to callers, or editing the classification of callers as wanted or unwanted callers.

A probability that the phone number is associated with an unwanted caller is calculated, step 108. The probability of a caller being an unwanted caller may be calculated based upon the calling patterns determined by the call record server, which is described in further detail with respect to the description of an engine included in the phone directory server illustrated in FIG. 3. The users of the call answering system (or audience of telephony device users) can also agree or disagree with the classification of a caller as unwanted, or any other information in the directory, further strengthening the categorization of a specific calling number as universally unwanted by a distributed audience. Based on the calling patterns and voting from the audience, the phone directory server may calculate the probability of the phone number being from an unwanted caller. A threshold may be configured such that if the calculated probability exceeds the threshold, step 110, the phone number is recorded as an unwanted caller, step 112. Otherwise, the method proceeds to identify a number of another caller in step 102. Alternatively, a probability does not need to be calculated to record a phone number as an unwanted caller for instances where a caller from a number is explicitly identified as an unwanted or wanted caller.

Users of the call answering system can dispose of calls from unwanted callers depending on their personal preferences (which may be stored on a server or call answering application installed on the user's phone device). In one example, the call answering service server is able to answer the unwanted caller's phone call and play a sequence of tones followed by a "disconnected message" that emulates the behavior of a phone number that is not in service. Typically, telemarketers employ dialing systems that upon discovering a disconnected number, will remove that number from repeat dialing attempts. In this manner, users of the call answering system may receive a single call from an unwanted caller, and then be removed from that unwanted caller's dialing list, so that they are not contacted again in the future.

Figure 2:
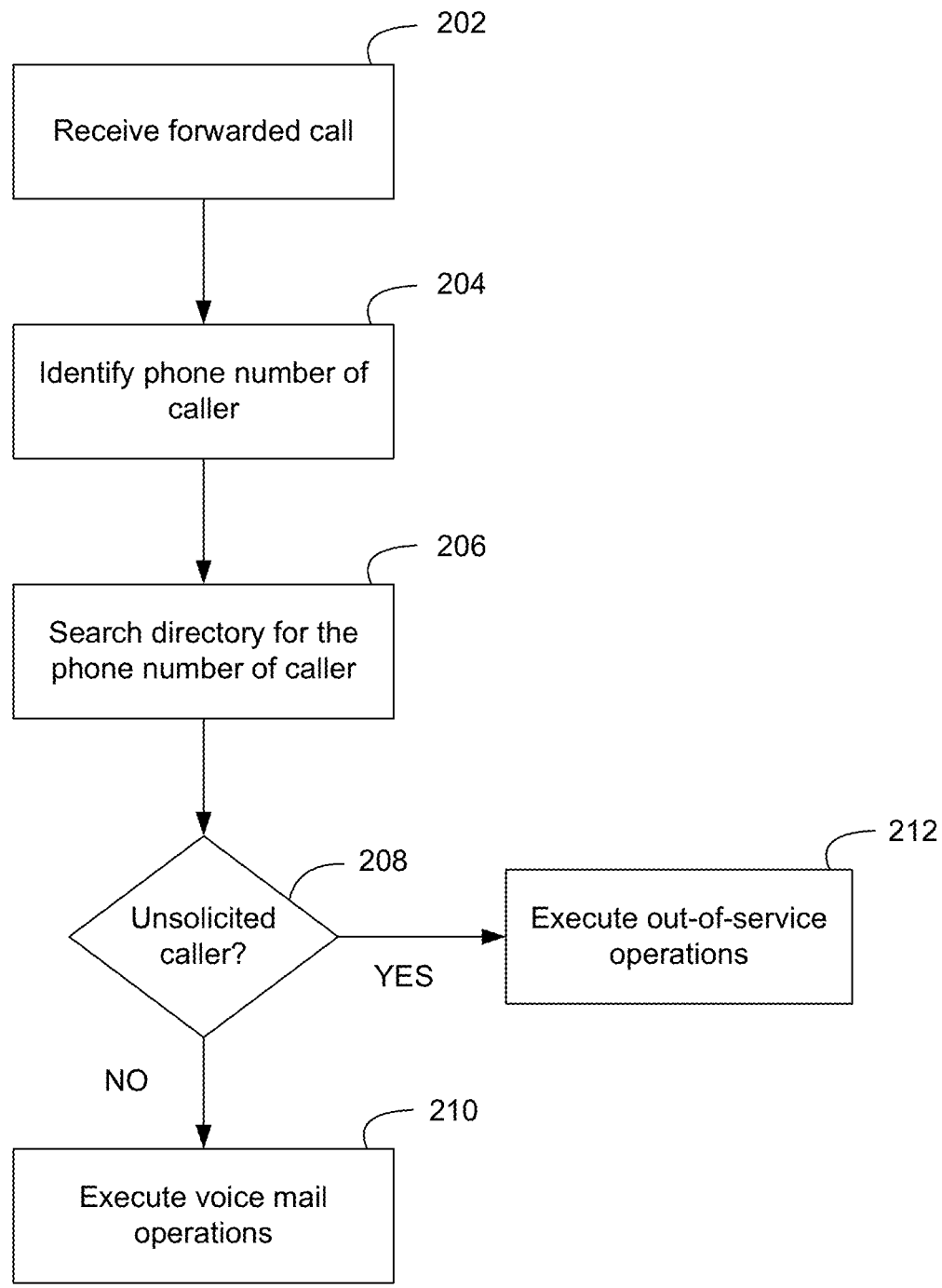
FIG. 2 illustrates a flowchart of a method for handling calls from unwanted callers according to an embodiment of the present invention.

FIG. 2 illustrates a flowchart of a method for handling calls from unwanted callers by a call answering server according to an embodiment of the present invention. A call is received, step 202. The call may be a call that has been unanswered on a phone device and is forwarded to a call answering service server. The call may also be a call received at a central phone system such as a PBX system for switching or routing to the phone device. The call answering service server identifies a phone number of a caller associated with the call, step 204. In certain instances, the phone number of the caller may be intentionally hidden or "spoofed." The call answering service server may challenge or prompt the caller to provide a valid calling number such that classification of the given caller as a wanted or unwanted caller can be determined and cannot be circumvented by omitting, disguising or "spoofing" the calling number. Alternatively, the call answering service server may intercept the call from an unknown or unverified number and perform any of the following: 1) report to the caller that the person they are calling does not accept these kinds of calls, 2) report to the caller that the person they are calling does not accept any calls, and 3) hung up on the caller and/or optionally play a disconnected message.

A directory is searched for the phone number of the caller, step 206. The phone number may be searched by contacting a phone directory server to determine whether the caller is an unwanted caller, step 208. The phone directory server may include information on phone numbers that have been aggregated from the call records server and an indication of the likelihood that a given number is from an unwanted caller. If the phone number is not determined as being associated with an unwanted caller, voice mail operations are executed, step 210. Voice mail operations may include greeting the caller with a message, prompting the caller to leave a message, recording the message, and other answering service operations (e.g., PBX—"Press '1' for sales, Press '2' for . . . ). However, if the phone number is determined to be associated with an unwanted caller, out-of-service operations are executed, step 212. Users may be provided with the option to automatically reject and dispose of unwanted callers should their telephone device receive a call from an unsolicited caller. Out-of-service operations may include playing a sequence of tones to the caller followed by a "disconnected message" that emulates the behavior of a phone number that is not in service. Additionally, users can configure their telephone devices to not ring or display the incoming call when they are determined to be unwanted, thus effectively eliminating any personal distraction that may have otherwise experienced upon receiving a call from an unwanted caller.

Figure 3:
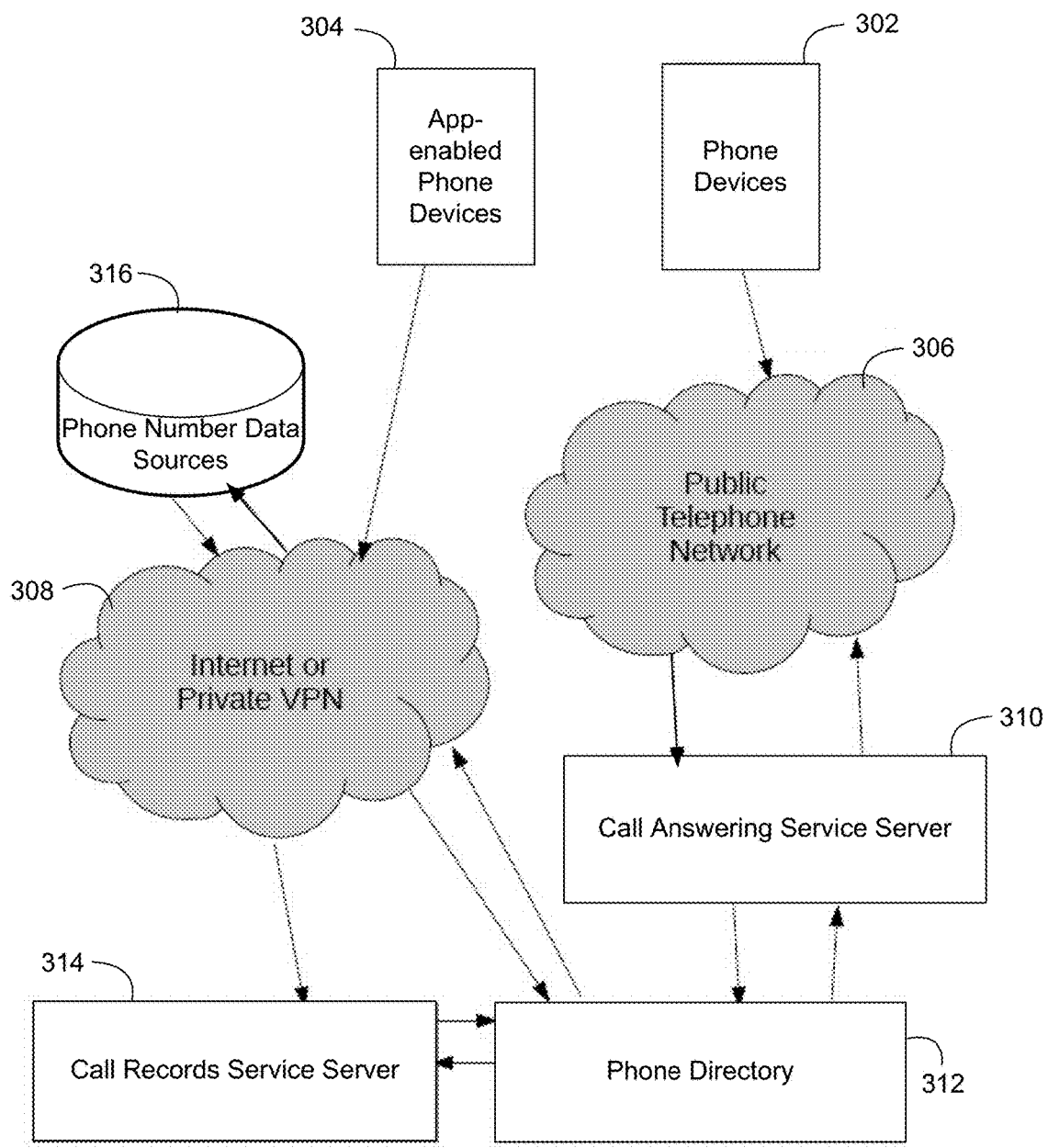
FIG. 3 illustrates a computing system according to an embodiment of the present invention.

FIG. 3 illustrates a computing system according to an embodiment of the present invention. The system presented in FIG. 3 includes phone devices 302 (such as landline, cellular, analog, digital, satellite, radio, etc.), that are capable of establishing and receiving telephonic communications via a public telephone network 306, as well as application/app-enabled phone devices 304 capable of establishing and receiving telephonic communications via the Internet 308 (e.g., using VoIP). In some embodiments the app-enabled phone devices 304 are enabled with a personal assistant app such as the one available from YouMail Inc., www.youmail.com, the assignee of the present patent application.

According to another embodiment, the system includes a private VPN (virtual private network) 308, or any other communications network. App-enabled phone devices 304 may be a computing device capable of running a telephony-related application (e.g., WiFi calling system, VoIP phone, etc.). Examples of computing devices include personal computers, television set top boxes, terminals, mobile smartphones, laptops, personal digital assistants (PDA), tablet computers, e-book readers, or any computing device having a central processing unit and memory unit capable of connecting to a communications network. The computing device may also comprise a graphical user interface (GUI) or a browser application provided on a display (e.g., monitor screen, LCD or LED display, projector, etc.). A computing device may also include or execute an application to communicate content, such as, for example, textual content, multimedia content, or the like. A computing device may also include or execute an application to perform a variety of possible tasks, such as browsing, searching, playing various forms of content, including streamed audio and video. A computing device may include or execute a variety of operating systems, including a personal computer operating system, such as a Windows, Mac OS or Linux, or a mobile operating system, such as iOS, Android, or Windows Mobile, or the like. A computing device may include or may execute a variety of possible applications, such as a computing software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples.

In accordance with embodiments of the invention, the system further includes a call records service server 314, a phone directory server 312, and a call answering service server 310. These servers may vary widely in configuration or capabilities, but generally a server each includes one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The call records service server 314 is able to accumulate phone numbers and information about the phone numbers from a variety of sources that can be used to determine if a given phone number is that of an unwanted caller. One such source are the app-enabled phone devices 304 shown in FIG. 3, which may send a list or log of calls made and received, and a list of contacts including phone numbers and associated identifiers to the call records service server 314 over the VPN, Internet or other communication network 308. Another source of information for accumulation in the call records service server 314 include publicly available phone number data sources 316, such as, telephone listings and directories, electronic yellow pages, and the like. Still other possible sources of information for populating the call records service 314 include voicemail transcription systems such as the personal assistant app from YouMail as mentioned above, cell phone billing records, telephone and cable service provider records such as CDRs (call detail records), and the like.

The phone directory server 312 may include phone numbers that have been aggregated by the call records service server 314, information about the phone numbers, and for each phone number, an indication of the likelihood that the phone number is that of an unwanted caller. Phone directory server 312 includes an engine that determines the likelihood that a particular number is that of an unwanted caller based on the information about the phone numbers by using the techniques described herein. The indication of likelihood may be represented by a binary flag indicating whether or not the number has been determined as exceeding a threshold value set as likely to be that of an unwanted caller. Alternatively, the likelihood may be represented with a score value computed as the likelihood of representing an unwanted caller based on a set of quantitative rules. In another embodiment, an indication may be retrieved from the call records service server 314 that explicitly identifies a phone number as an unwanted caller (or categorized otherwise) by one or more users.

The engine of phone directory server 312 can use various set of rules to help it determine the likelihood or probability of a number being that of an unwanted caller. For example, a rule can be: If a number N is a wireless number, and it has called more than N times to Y different users within a period of M minutes, then it is 100% sure to be a number of an unwanted caller. This rule assumes that it is impossible or highly unlikely for a person with a cell phone to dial more than a certain number of calls in a certain period of time—if a determination of more than what's achievable or reasonable in that time period, the number may be spoofed and an unwanted caller is using it. Another exemplary rule can be: If N has a non-zero score and the hashed content of a message N matches the hashed content of messages from a number M known to be an unwanted caller, then N is the number of an unwanted caller. This rule is dependent on the fact that unwanted callers tend to leave the same automated message over and over, and if a new number leaves the same message, it is likely from an unwanted caller. Yet another rule may include determining whether a calling number is valid based on whether it belongs to a real area code or a real subset of that area code. There can be a variety of other rules or rule equivalents and any combination thereof.

The call answering service server 310 may query the phone directory server 312 to identify whether an incoming call to a receiving phone device from a given number is likely to be that of an unwanted caller. If it's likely to be the number of an unwanted caller, the call answering service server 310 can be configured to play an appropriate message containing SIT tones to indicate out of service to an unwanted caller and terminate the call. On playing the message, the call answering service server 310 may combine or create messages from the carrier of the user and/or the carrier of the caller to provide a message identical to that the carrier would play for a disconnected number. The message played by call answering service server 310 need not be a generic message but can simulate an actual Telco experience. For example, if a user is a subscriber from a specific carrier, call answering service server 310 may play the carrier's specific audio to an unwanted caller. If the number is determined not likely from that of an unwanted caller, call answering service server 310 may perform voice mail operations such as playing a message that the subscriber of the receiving phone device is unavailable and the caller may record a voice message.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method performed by a call answering system for identifying unwanted callers, the method comprising:
   collecting, by a call records server, data about phone numbers, the data collected from a plurality of telephony devices and one or more phone number data sources over a communications network, the data collected including call patterns of the phone numbers to one or more of the plurality of telephony devices wherein the call patterns include contact information from the plurality of telephony devices;
   determining, by the call records server, a probability of each of the phone numbers being associated with an unwanted caller based on the collected data; and
   executing, by a call answering system, operations on calls to a receiving telephone device based on the determined probability of each of the phone numbers being associated with an unwanted caller.

2. The method of claim 1 wherein executing the operations on the calls further comprises playing a call answering message based on the determined probability of each of the phone numbers.

3. The method of claim 1 further comprising determining a given call is associated with a phone number from an unwanted caller based on the determined probability of each of the phone numbers.

4. The method of claim 3 further comprising configuring a given telephony device to not display the given call.

5. The method of claim 1 wherein the call patterns further include previous calls to the plurality of telephony devices.

6. The method of claim 1 wherein the call patterns further include voice messages associated with the phone numbers.

7. The method of claim 1 further comprising determining whether the phone numbers are pre-existing contacts associated with the plurality of telephony devices.

8. The method of claim 1 wherein the call patterns further include information provided by end-users of the plurality of telephony device that indicate the phone numbers are associated with unwanted callers.

9. The method of claim 1 wherein the call patterns further include carrier information associated with the phone numbers, whether the phone numbers are wireless device numbers, and names associated with the phone numbers.

10. The method of claim 1 wherein determining the probability of each of the phone numbers associated with an unwanted caller further comprises determining whether the phone numbers are wireless device numbers and have been used to called more than a predetermined number of times to a predetermined number of telephony devices within a given period.

11. The method of claim 1 wherein determining the probability of each of the phone numbers associated with an unwanted caller further comprises comparing hashed content of messages from the phone numbers with hashed content of messages from one or more phone numbers that are associated with unwanted callers.

12. The method of claim 1 further comprising:
   receiving classification voting of the phone numbers from the plurality of telephony devices; and
   determining the probability of each of the phone numbers being associated with an unwanted caller based on the classification voting.

13. A system for identifying an unwanted caller comprising:
   a call records server configured to:
   collect data about phone numbers, the data collected from a plurality of telephony devices and one or more phone number data sources over a communications network, the data collected including call patterns of the phone numbers to one or more of the plurality of telephony devices,
   determine a probability of each of the phone numbers being associated with an unwanted caller based on the collected data,
   determine whether the phone numbers are pre-existing contacts associated with the plurality of telephony devices; and
   a call answering server configured to:
   execute operations on calls to a receiving telephone device based on the determined probability of each of the phone numbers being associated with an unwanted caller.

14. The system of claim 13 wherein the call answering server is further configured to play a call answering message based on the determined probability of each of the phone numbers.

15. The system of claim 13 wherein the call records server is further configured to determine a given call is associated with a phone number from an unwanted caller based on the determined probability of each of the phone numbers.

16. The system of claim 13 wherein the call patterns further include previous calls to the plurality of telephony devices.

17. The system of claim 13 wherein the call patterns further include information provided by end-users of the plurality of telephony device that indicate the phone numbers are associated with unwanted callers.

18. Non-transitory computer-readable media comprising program code that when executed by a programmable processor causes execution of a method for identifying an unwanted caller, the computer-readable media comprising:
   computer program code for collecting data about phone numbers, the data collected from a plurality of telephony devices and one or more phone number data sources over a communications network, the data collected including call patterns of the phone numbers to one or more of the plurality of telephony devices wherein the call patterns further include contact information from the plurality of telephony devices;

computer program code for determining a probability of each of the phone numbers being associated with an unwanted caller based on the collected data; and computer program code for executing operations on calls to a receiving telephone device based on the determined probability of each of the phone numbers being associated with an unwanted caller.

19. A method performed by a call answering system for identifying unwanted callers, the method comprising:

collecting, by a call records server, data about phone numbers, the data collected from a plurality of telephony devices and one or more phone number data sources over a communications network, the data collected including call patterns of the phone numbers to one or more of the plurality of telephony devices wherein the call patterns include information provided by end-users of the plurality of telephony device that indicate the phone numbers are associated with unwanted callers;

determining, by the call records server, a probability of each of the phone numbers being associated with an unwanted caller based on the collected data; and executing, by a call answering system, operations on calls to a receiving telephone device based on the determined probability of each of the phone numbers being associated with an unwanted caller.

20. The method of claim 19 further comprising determining a given call is associated with a phone number from an unwanted caller based on the determined probability of each of the phone numbers.

21. The method of claim 19 wherein the call patterns further include previous calls to the plurality of telephony devices.

22. The method of claim 19 wherein the call patterns further include voice messages associated with the phone numbers.

23. The method of claim 19 further comprising determining whether the phone numbers are pre-existing contacts associated with the plurality of telephony devices.

24. The method of claim 19 wherein the call patterns further include carrier information associated with the phone numbers, whether the phone numbers are wireless device numbers, and names associated with the phone numbers.

25. The method of claim 19 wherein determining the probability of each of the phone numbers associated with an unwanted caller further comprises determining whether the phone numbers are wireless device numbers and have been used to called more than a predetermined number of times to a predetermined number of telephony devices within a given period.

26. A system for identifying an unwanted caller comprising:

a call records server configured to:

collect data about phone numbers, the data collected from a plurality of telephony devices and one or more phone number data sources over a communications network, the data collected including call patterns of the phone numbers to one or more of the plurality of telephony devices wherein the call patterns include information provided by end-users of the plurality of telephony device that indicate the phone numbers are associated with unwanted callers, determine a probability of each of the phone numbers being associated with an unwanted caller based on the collected data; and a call answering server configured to:

execute operations on calls to a receiving telephone device based on the determined probability of each of the phone numbers being associated with an unwanted caller.

27. The system of claim 26 wherein the call answering server is further configured to play a call answering message based on the determined probability of each of the phone numbers.

28. The system of claim 26 wherein the call records server is further configured to determine a given call is associated with a phone number from an unwanted caller based on the determined probability of each of the phone numbers.

29. The system of claim 26 wherein the call patterns further include previous calls to the plurality of telephony devices.

30. The system of claim 26 wherein the call patterns further include voice messages associated with the phone numbers.

31. The system of claim 26 wherein the call records server is further configured to determine whether the phone numbers are pre-existing contacts associated with the plurality of telephony devices.

32. The system of claim 26 wherein the call patterns further include carrier information associated with the phone numbers, whether the phone numbers are wireless device numbers, and names associated with the phone numbers.

33. The system of claim 26 wherein the call records server is further configured to determine whether the phone numbers are wireless device numbers and have been used to called more than a predetermined number of times to a predetermined number of telephony devices within a given period.

34. Non-transitory computer-readable media comprising program code that when executed by a programmable processor causes execution of a method for identifying an unwanted caller, the computer-readable media comprising:

computer program code for collecting data about phone numbers, the data collected from a plurality of telephony devices and one or more phone number data sources over a communications network, the data collected including call patterns of the phone numbers to one or more of the plurality of telephony devices wherein the call patterns further include information provided by end-users of the plurality of telephony device that indicate the phone numbers are associated with unwanted callers;

computer program code for determining a probability of each of the phone numbers being associated with an unwanted caller based on the collected data; and computer program code for executing operations on calls to a receiving telephone device based on the determined probability of each of the phone numbers being associated with an unwanted caller.

35. The non-transitory computer-readable media of claim 34 further comprising computer program code for determining a given call is associated with a phone number from an unwanted caller based on the determined probability of each of the phone numbers.

36. The non-transitory computer-readable media of claim 34 wherein the call patterns further include previous calls to the plurality of telephony devices.

37. The non-transitory computer-readable media of claim 34 wherein the call patterns further include voice messages associated with the phone numbers.

38. The non-transitory computer-readable media of claim 34 further comprising computer program code for determining whether the phone numbers are pre-existing contacts associated with the plurality of telephony devices.

39. The non-transitory computer-readable media of claim 34 wherein the call patterns further include carrier information associated with the phone numbers, whether the phone numbers are wireless device numbers, and names associated with the phone numbers.

40. The non-transitory computer-readable media of claim 34 wherein computer program code for determining the probability of each of the phone numbers associated with an unwanted caller further comprises computer program code for determining whether the phone numbers are wireless device numbers and have been used to called more than a predetermined number of times to a predetermined number of telephony devices within a given period.

* * * * *